United States Patent
Hsieh et al.

(10) Patent No.: US 9,107,249 B2
(45) Date of Patent: Aug. 11, 2015

(54) ADJUSTING BRIGHTNESS OF AN OPTICAL TOUCH PANEL

(71) Applicant: TOSHIBA GLOBAL COMMERCE SOLUTIONS HOLDINGS CORPORATION, Tokyo (JP)

(72) Inventors: Tsung Hsuan Hsieh, Banqiao (TW); Wei Yi Hsuan, Taipei (TW); Yi Sheng Lee, Taipei Hsien (TW); Robert David Parsons, Raleigh, NC (US); Chia Lin Yang, Taipei (TW)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 14/318,505

(22) Filed: Jun. 27, 2014

(65) Prior Publication Data

US 2014/0312783 A1    Oct. 23, 2014

Related U.S. Application Data

(63) Continuation of application No. 12/895,123, filed on Sep. 30, 2010, now Pat. No. 8,797,296.

(30) Foreign Application Priority Data

Sep. 30, 2009 (TW) ............... 98133301 A

(51) Int. Cl.
*H05B 37/02* (2006.01)
*G06F 3/041* (2006.01)
(Continued)

(52) U.S. Cl.
CPC .......... *H05B 37/0218* (2013.01); *G06F 3/0412* (2013.01); *G06F 3/0416* (2013.01);
(Continued)

(58) Field of Classification Search
CPC ................ G06F 3/0416; G06F 3/0421; G09G 2320/0626

USPC .................. 345/102, 175–178; 356/614–624; 362/97.1–97.4
See application file for complete search history.

(56) References Cited

U.S. PATENT DOCUMENTS 4,742,387 A    5/1988    Oshima
4,769,708 A    9/1988    Stoughton
(Continued)

FOREIGN PATENT DOCUMENTS

WO    2009116205 A1    9/2009

OTHER PUBLICATIONS

Peter N. Belhumeur, Terry E. Boult, and Shree K. Nayar, Lighting Sensitive Display, ACM Transactions on Graphics, pp. 963-979, vol. 23, No. 4, Oct. 2004, New York, NY, http://www1.cs.columbia.edu/~belhumeur/conference/Nayar_TS04.pdf.
(Continued)

*Primary Examiner* — Priyank Shah
(74) *Attorney, Agent, or Firm* — The Steadman Law Firm PLLC

(57) ABSTRACT

A method, device, and computer program product are provided for adjusting brightness of an optical touch panel. The optical touch panel comprises a microprocessor, a display module including a back light source, and an optical position detection device including optical transmitting devices and optical receiving devices. The method comprises detecting, via the optical receiving devices, a current ambient light level on the display module. The method further comprises generating, via the optical receiving devices, a current ambient light level signal indicative of the detected current ambient light level and transmitting the current ambient light level signal to the microprocessor. Furthermore, the method comprises adjusting, via the microprocessor, brightness of the back light source based on the current ambient light level signal.

20 Claims, 10 Drawing Sheets

(51) Int. Cl.
*G06F 3/042* (2006.01)
*G09G 3/34* (2006.01)

(52) U.S. Cl.
CPC ............ *G06F3/0421* (2013.01); *G09G 3/3406* (2013.01); *G09G 2320/0626* (2013.01); *G09G 2320/0633* (2013.01); *G09G 2360/144* (2013.01)

(56) References Cited

U.S. PATENT DOCUMENTS

| | | | |
|---|---|---|---|
| 5,162,783 | A | 11/1992 | Moreno |
| 5,381,349 | A | 1/1995 | Winter et al. |
| 6,069,598 | A | 5/2000 | Hansen |
| 6,762,741 | B2 | 7/2004 | Weindorf |
| 6,870,529 | B1 | 3/2005 | Davis |
| 7,490,253 | B2 | 2/2009 | Yoshioka et al. |
| 8,077,136 | B2 | 12/2011 | Ito |
| 2003/0179323 | A1 | 9/2003 | Abileah et al. |
| 2006/0103637 | A1 | 5/2006 | Yamaguchi et al. |
| 2006/0256093 | A1* | 11/2006 | Furukawa et al. ............ 345/173 |
| 2007/0125937 | A1 | 6/2007 | Eliasson et al. |
| 2007/0188441 | A1 | 8/2007 | Tanaka et al. |
| 2007/0222730 | A1 | 9/2007 | Kao et al. |
| 2008/0290803 | A1 | 11/2008 | Santo et al. |
| 2009/0127461 | A1 | 5/2009 | Holcombe et al. |
| 2009/0135333 | A1 | 5/2009 | Tai et al. |
| 2009/0141003 | A1 | 6/2009 | Xuan et al. |
| 2010/0007632 | A1 | 1/2010 | Yamazaki |
| 2010/0033445 | A1 | 2/2010 | Shimizu et al. |
| 2010/0059296 | A9 | 3/2010 | Abileah et al. |
| 2010/0315382 | A1 | 12/2010 | Kurihara et al. |
| 2011/0074737 | A1* | 3/2011 | Hsieh et al. ................... 345/175 |
| 2011/0279414 | A1 | 11/2011 | Noma et al. |

OTHER PUBLICATIONS

Fergason Patent Properties, System Synchronized Brightness Control (SSBC™): Dramatically Improving LCD and Projection Images, 2006, http://fergasonpatents.com/ssbc/SSBC-WP.pdf.

Matthew Trentacoste, Photometric Image Processing for High Dynamic Range Displays, The University of British Columbia, Jan. 2006, http://www.cs.ubc.ca/grads/resources/thesis/May06/Trentacoste_Matthew.pdf.

* cited by examiner

ADJUSTING BRIGHTNESS OF AN OPTICAL TOUCH PANEL

CROSS REFERENCE TO RELATED APPLICATIONS

The present application is a continuation application of U.S. patent application Ser. No. 12/895,123 filed Sep. 30, 2010. The present application claims priority under 35 U.S.C. §120 to U.S. patent application Ser. No. 12/895,123, which claims priority under 35 U.S.C. §119 to Taiwanese Patent Application No. 98133301 filed Sep. 30, 2009, the contents of which are incorporated by reference herein.

FIELD OF THE INVENTION

The various embodiments described herein relate to an information display apparatus, and more particularly to an optical touch screen apparatus.

BACKGROUND

Touch panels are used for input and output interfaces of information apparatuses, e.g., Point of Sale (POS) systems, mobile devices, automatic teller machines (ATMs), cashers, kiosks, and interactive multimedia stations. Touch panels are typically categorized as pressure-sensitive touch panels, resistance type touch panels, surface sound wave type touch panels, capacitance touch panels, and infrared touch panels.

For optical touch panels such as infrared touch panels, a plurality of infrared transmitting devices and a plurality of infrared receiving devices are mounted on the printed circuit board thereof. The shape of the printed circuit board is typically rectangular, and the inner area of the printed circuit board is removed. Along one pair of opposite strips of the printed circuit board, the infrared transmitting devices and the infrared receiving devices are mounted and aligned to each other, and along the other pair of opposite strips of the printed circuit board, the infrared transmitting devices and the infrared receiving devices are mounted and aligned with each other. The aligned infrared transmitting devices and infrared receiving devices define a matrix of intersecting light beams that coincide with the graphical icons and the computer-generated graphics at the infrared touch panel. When the intersecting beams are disrupted by an object (e.g., the finger of a user), the position at which the disruption occurs may be precisely calculated.

Currently, optical touch panels mainly use liquid crystal displays (LCD) or the like, and they are illuminated by a back light source to increase the visibility of the display and enhance contrast thereof. Some optical touch panels have fixed brightness levels from their back light sources. When there is substantially consistent ambient light during operation of the display, the fixed brightness level may be suitable. However, in many situations in which devices use optical touch panels, a fixed brightness level may not be suitable. For example, energy may be wasted if devices such as POS systems, ATMs, kiosks, etc. are turned on at a fixed brightness level for a long period of time. In addition, some shops with alternate business hours may have lighting needs that change frequently, and thus energy may be wasted if the devices are turned on at a fixed brightness level for a long period of time. Moreover, energy may be wasted if the devices are turned on during non-business hours. Furthermore, leaving optical touch panels turned on unnecessarily will also shorten the life thereof, especially if the brightness level is high.

In addition, when the brightness level of the back light source is set to a specific value, the display brightness may be considered proper under normal lighting. However, there may be different ambient light levels in different environments where a user views the screen, and additionally there may be different ambient light levels during different periods of time when a user views the screen. In ambient light of low intensity, a user may prefer lower brightness levels for the display, because most can view the screen adequately at a relatively low brightness level. Conversely, in ambient light of high intensity, a user may prefer high brightness levels for the display. Thus, it is important to consider ambient light levels and to adjust display brightness level accordingly. Taking a POS system for example, in different locations (such as the extremes of a high-latitude location and a low-latitude location and in-between locations) or during different periods of time (such as the extremes of night and day and in-between periods), a fixed brightness level is not a good solution.

A solution could entail permitting a user to manually adjust the brightness level of the optical touch panel. However, such solution is usually considered troublesome, and a user tends to set the brightness to the maximum value, which may shorten the lifespan of the optical touch panel.

A further solution could entail adding an additional light sensor. However, such solution may increase manufacturing cost. In addition, the light sensor used in such solution (e.g., a CDS sensor) may have relatively unacceptable errors. Furthermore, the additional light sensor needed for such solution must be mounted on the optical touch panel, thus increasing assembly overhead.

SUMMARY

The various embodiments described herein provide an optical touch panel device and an associated method and computer program product to address the aforementioned issues.

In accordance with a first aspect of the various embodiments described herein, a method is provided for adjusting brightness of an optical touch panel arranged on an electrical device. The optical touch panel comprises a microprocessor, a display module including a back light source, and an optical position detection device including optical transmitting devices and optical receiving devices. The method comprises detecting, via the optical receiving devices, a current ambient light level on the display module. The method further comprises generating, via the optical receiving devices, a current ambient light level signal indicative of the detected current ambient light level and transmitting the current ambient light level signal to the microprocessor. Furthermore, the method comprises adjusting, via the microprocessor, brightness of the back light source based on the current ambient light level signal.

The back light source may be in one of a plurality of operation modes. The plurality of operation modes may comprise a low brightness mode in which the back light source is set to a first back light source brightness level and the electrical device is correspondingly set to a normal operation configuration in response to the current ambient light level being maintained at a first ambient light brightness level. The plurality of operation modes further may comprise a power saving mode, wherein in the power saving mode the back light source is switched off and the electrical device is correspondingly set to a sleep operation configuration in response to the current ambient light level being lower than a second ambient light brightness level, and wherein in the power saving mode the back light source is switched on to a second back light source brightness level and the electrical device is correspondingly set to a normal operation configuration in response to the current ambient light level being higher than the second ambient light brightness level. Additionally, the plurality of operation modes may comprise a normal mode in which the back light source is fixedly set to a third back light source brightness level.

The method in accordance with the first aspect further may comprise obtaining a current gain G under a user-adjusted normal ambient light condition, wherein the current gain G is obtained by exposing the optical receiving devices to the user-adjusted normal ambient light condition for a first period of time, reading current gain values from the optical receiving devices during the first period of time, ranking the current gain values from high to low, and averaging an effective percentage range of the current gain values. The current gain G is inversely proportional to the current ambient light level. Moreover, the method may comprise obtaining a minimum gain Gmin under a maximum ambient light condition, wherein the minimum gain Gmin is obtained by exposing the optical receiving devices to the maximum ambient light condition for a second period of time, reading minimum gain values from the optical receiving devices during the second period of time, ranking the minimum gain values from high to low, and averaging an effective percentage range of the minimum gain values. Furthermore, the method may comprise obtaining a maximum gain Gmax under a minimum ambient light condition, wherein the maximum gain Gmax is obtained by exposing the optical receiving devices to the minimum ambient light condition for a third period of time, reading maximum gain values from the optical receiving devices during the third period of time, ranking the maximum gain values from high to low, and averaging an effective percentage range of the maximum gain values.

Additionally, the method may comprise switching off the optical transmitting devices and the optical receiving devices prior to obtaining the current gain G, the minimum gain Gmin, or the maximum gain Gmax. The method also may comprise switching off the back light source in response to the current gain G being larger than P % multiplied by the maximum gain Gmax, where P % is between 70% and 90%.

The method further may comprise providing a predefined relation between the current ambient light level and the brightness of the back light source and obtaining an automatically calibrated brightness of the back light source based on the predefined relation and the current ambient light level. Accordingly, the aforementioned plurality of operation modes may comprise an automatic calibration mode in which the back light source is automatically adjusted to the automatically calibrated brightness in response to a change in the current ambient light level. The automatically calibrated brightness may be calculated using the following equation and solving for X: $(P2\%\times Gmax-G)/(P2\%\times Gmax-Gmin)=(P1\%\times U-X)/(P1\%\times U-P2\%\times U)$, where U is user-defined brightness, $130\%>P1\%>105\%$, and $95\%>P2\%>70\%$. Moreover, the predefined relation may comprise a predefined brightness profile, wherein a first calibration brightness profile and a second calibration brightness profile are defined to envelop the predefined brightness profile, wherein the first calibration brightness profile is a product of the predefined brightness profile multiplied by P1%, and wherein the second calibration brightness profile is a product of the predefined brightness profile multiplied by P2%.

In accordance with a second aspect of the various embodiments, an optical touch panel device is provided for adjusting brightness of an optical touch panel. The optical touch panel device may comprise a display module having a display area and a back light source, control circuitry electrically coupled to the display module, and an optical position detection device coupled to the display module. The optical position detection device may comprise optical transmitting devices and optical receiving devices. The optical receiving devices may detect a current ambient light level on the display module, may generate a current ambient light level signal indicative of the detected current ambient light level, and may transmit the current ambient light level signal to the control circuitry. The control circuitry may adjust brightness of the back light source based on the current ambient light level signal.

The back light source may be in one of a plurality of operation modes in response to one of the conditions of the ambient lighting. The operation modes may include a low brightness mode, a power saving mode, and a normal mode similar to the corresponding operation modes described above with respect to the first aspect of the various embodiments.

The control circuitry may further comprise a microprocessor and a memory. The optical touch panel device may further comprise an amplifier electrically coupled between the optical receiving devices and the microprocessor for amplifying the current ambient light level signal generated by the optical receiving devices. The amplifier may have a gain inversely proportional to the current ambient light level, and the current ambient light level may be proportional to the brightness of the back light source.

The memory of the control circuitry may comprise a current gain calculation module for obtaining a current gain G under a user-adjusted normal ambient light condition after the optical receiving devices are exposed for a first period of time, a minimum gain calculation module for obtaining a minimum gain Gmin under a maximum ambient light condition after the optical receiving devices are exposed for a second period of time, and a maximum gain calculation module for obtaining a maximum gain Gmax under a minimum ambient light condition after the optical receiving devices are exposed for a third period of time. The memory may further comprise an automatic calibration calculation module for automatically calibrating the back light source to an automatically calibrated brightness based on the current ambient light level and a predefined relation between the current ambient light level and the brightness of the back light source. Accordingly, the plurality of operation modes may comprise an automatic calibration mode in which the back light source is automatically adjusted to the automatically calibrated brightness by the automatic calibration calculation module in response to a change in the current ambient light level.

The automatically calibrated brightness may be calculated via the equation provided above respect to the first aspect of the various embodiments. Moreover, the predefined relation may comprise a predefined brightness profile with characteristics similar to those described above with respect to the first aspect.

The foregoing and other features of the various embodiments will be apparent in the following detailed description.

BRIEF DESCRIPTION OF THE DRAWINGS

The various embodiments described herein will be described in detail with reference to the following figures.

DETAILED DESCRIPTION

Reference throughout this specification to "one embodiment," "an embodiment," or similar language signifies that a particular feature, structure, or characteristic described in connection with the embodiment is included in at least one embodiment. Thus, appearances of the phrases "in one embodiment," "in an embodiment," and similar language throughout this specification may, but do not necessarily, refer to the same embodiment.

Figure 1:
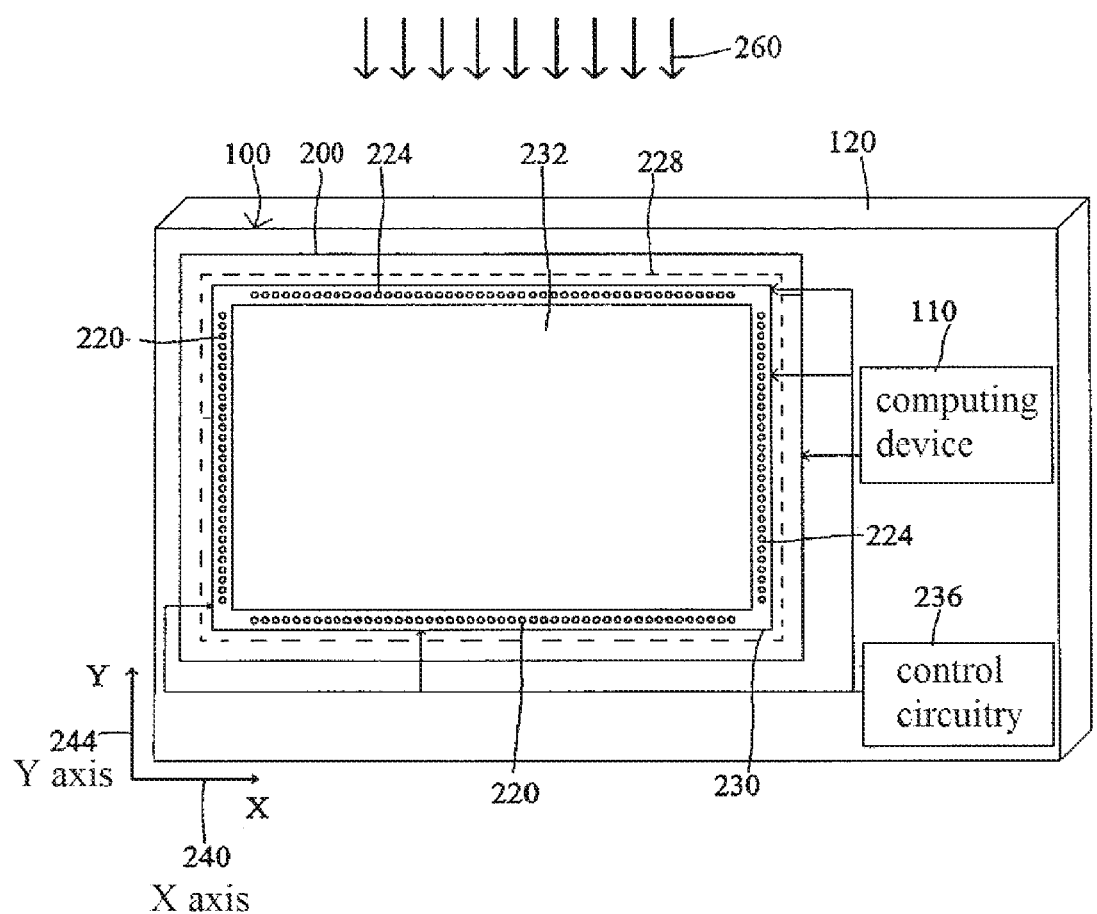
FIG. 1 illustrates an electrical device having an optical touch screen apparatus, according to an exemplary embodiment.

FIG. 1 illustrates an electrical device 100 (e.g., a Point of Sale (POS) device) having an optical touch screen apparatus 200 (e.g., an infrared touch screen apparatus) according to an exemplary embodiment. The electrical device 100 may also comprise a computing device 110 and a device housing 120. The optical touch screen apparatus 200 may comprise a display module (e.g., a LCD display module) 228 and a frame (e.g., an infrared frame) 230 arranged over the display module 228. Both the display module 228 and the frame 230 may be of rectangular shape. Moreover, a display area (i.e., touch area) 232, where a touch position may be detected, is defined. The boundaries of display area 232 are defined by the frame 230. A plurality of optical transmitting devices, such as infrared transmitting devices 220, are mounted on two adjacent sides of the frame 230 (e.g., the bottom side and the left side), and a plurality of optical receiving devices, such as infrared receiving devices 224, are mounted on two opposite adjacent sides of the frame 230 (e.g., the top side and the right side).

The optical touch screen apparatus 200 further may comprise control circuitry 236. The control circuitry 236 may be disposed on an integrated circuit chip implemented in a conventional way known in the art for receiving and controlling the signals from the optical transmitting devices 220 and the optical receiving devices 224. By the above arrangement, the control circuitry 236 may allow the optical transmitting devices 220 to transmit beams sequentially from left to right and from bottom to top, and the control circuitry 236 may allow the optical receiving devices 224 to receive beams correspondingly. Thus, the optical transmitting devices 220 sequentially scan across the display area 232, and an optical beam matrix grid (e.g., an infrared beam matrix grid) is formed.

When an object (e.g. a touch pen or a finger) lies in a position on the display area 232, the object blocks beams from the optical transmitting devices 220 that otherwise would be received by the optical receiving devices 224. The control circuitry 236 may determine X rectangular coordinate of the object along X axis 240 and Y rectangular coordinate of the object along Y axis 244 by inspecting whether the beams are received by the optical receiving devices 224.

According to an exemplary embodiment, the computing device 110 may be a data processing apparatus (e.g., a computer) electrically connected to the display module 228. FIG. 1 also depicts the current ambient light level 260 around the electrical device 100.

Figure 2:
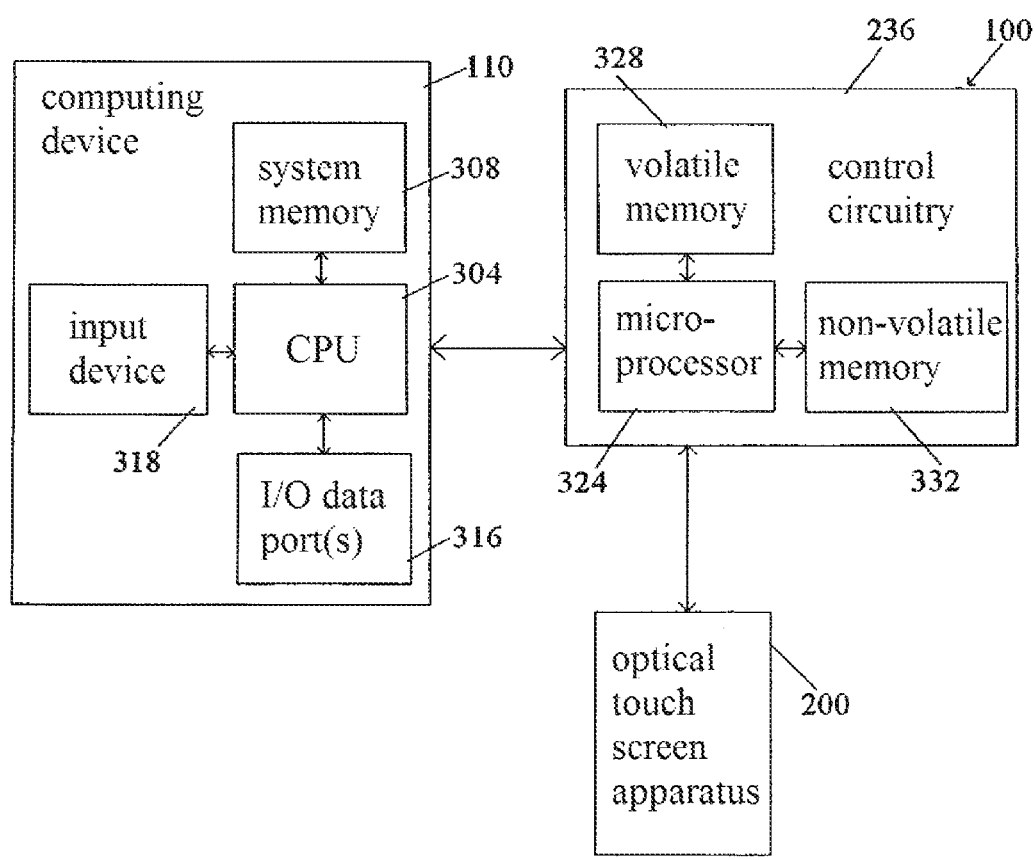
FIG. 2 illustrates a block diagram of an electrical device, according to an exemplary embodiment.

FIG. 2 illustrates a block diagram of the electrical device 100 according to an exemplary embodiment. As shown in FIG. 2, the electrical device 100 may comprise the computing device 110, the optical touch screen apparatus 200, and the control circuitry 236. The computing device 110 may typically comprise a CPU 304, an input device 318 that communicates with the CPU 304 (e.g., a touch input device, a mouse, a keyboard, or a keypad), and a system memory 308 that communicates with the CPU 304. The computing device 110 further may comprise an I/O data port(s) 316 that also communicates with the CPU 304. The I/O data port(s) 316 may be used to transfer information between the electrical device 100 and another electrical device or a network. The CPU 304 communicates with the system memory 308 via an address/data bus (indicated by an arrow in FIG. 2). The CPU 304 can be any commercially available or custom central processing unit. The system memory 308 is representative of the overall hierarchy of memory devices containing the software and data used to implement the functionality of the computing device 110. The system memory 308 may include, but is not limited to, the following types of devices: cache, ROM, PROM, EPROM, EEPROM, flash memory, SRAM, and DRAM. The above components may be conventional components, such as those used in many conventional data processing systems.

According to an exemplary embodiment, the control circuitry 236 may comprise a microprocessor 324, a volatile memory (e.g., SRAM) 328, and a non-volatile memory (e.g., flash memory) 322. Details and operation of the microprocessor 324, the volatile memory 328, and the non-volatile memory 322 are further described herein. The above components may be conventional components, such as those used in many conventional data processing systems.

The system memory 308 may comprise several categories of software and data used in the computing device 110: an operating system, application programs, input/output (I/O) device drivers, and data. As will be appreciated by those of skill in the art, the operating system may be any operating system suitable for use with a data processing system, such as Unix, Linux, OS/2, AIX, or System390 from International Business Machines Corporation, Armonk, N.Y., or Windows 95, Windows 98, Windows 2000, or Windows XP from Microsoft Corporation, Redmond, Wash. The I/O device drivers of the system memory 308 typically include software routines accessed through the operating system by the application programs to communicate with devices such as the I/O data port(s) and certain memory components. The application programs are illustrative of the programs that implement the various features of the data processing system and preferably comprise at least one application that supports operations in accordance with one or more of the various embodiments. The data of the system memory 308 represents the static and dynamic data used by the application programs, the operating system, the I/O device drivers, and other software programs. OS/2, AIX, and System390 are trademarks or registered trademarks of International Business Machines Corporation in the United States, other countries, or both. Windows 95, Windows 98, Windows 2000, and Windows XP are trademarks of Microsoft Corporation in the United States, other countries, or both.

It is noted that the various embodiments should not be construed as being limited to the configuration of FIG. 2. Rather, the various embodiments are intended to encompass any configuration capable of carrying out the operations described herein.

The optical touch screen apparatus 200 may be a conventional infrared touch panel comprising a conventional display module 228 (e.g. a LCD display module). In the display module 228, liquid crystal is typically used. Liquid crystal is a substance that receives light from a light source to display images and data, and accordingly a back light source 420 (see FIG. 3) powered by electricity supplies is usually required. Typically the display module 228 may comprise an LCD panel (not shown) and the back light source 420 under the LCD panel for supplying light thereto. Two polarized sheets are located on the top and bottom surfaces of the LCD panel, respectively. The back light source 420 may comprise a light source, a light guide plate, a reflecting sheet, a diffusion sheet, and a prism sheet. The above components and their operations are implemented in a conventional way known in the art. One of the major factors with respect to the brightness of the display module 228 involves the characteristics of back light source 420. For example, by adjusting the brightness of the back light source 420, the brightness of the display module 228 may be adjusted. The microprocessor 324 is electrically connected to back light source driver circuitry (not shown). The back light source driver circuitry is a conventional component of a conventional LCD display module and generates a brightness control signal for controlling the brightness of the optical touch screen apparatus 200.

Figure 3:
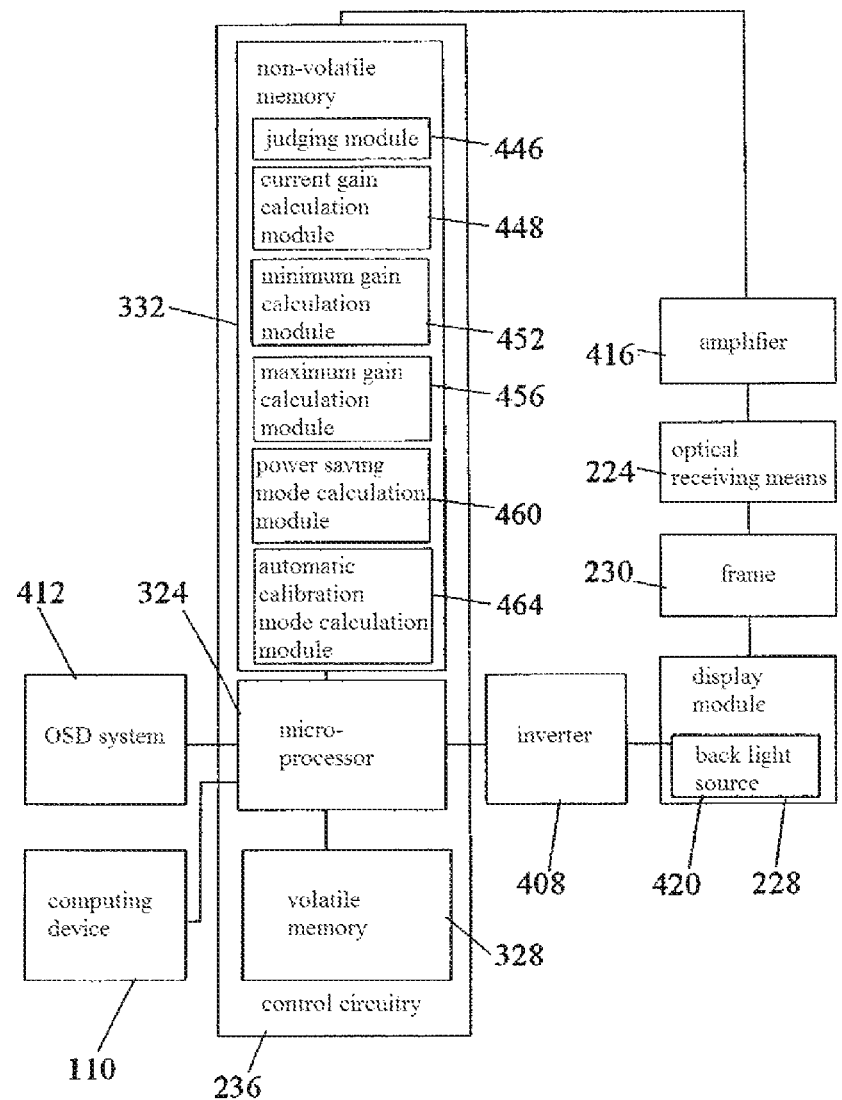
FIG. 3 illustrates a brightness control configuration for a back light source, according to an exemplary embodiment.

FIG. 3 illustrates a brightness control configuration for a back light source 420 according to an exemplary embodiment. An inverter 408 is electrically connected between the back light source 420 and the control circuitry 236. The inverter 408 transforms DC voltage to AC voltage. The control circuitry 236 controls the AC voltage to the back light source 420 in response to signals for adjusting the brightness, for turning on the light source, and for turning off the light source. That is, the control circuitry 236 controls the brightness/on/off conditions of the back light source 420. Typically, if the AC voltage is higher, the brightness will be higher as well.

FIG. 3 also illustrates an on-screen display (OSD) system 412. The on-screen display system 412 may comprise an OSD menu that appears on a computer monitor or television screen and that permits a user to select viewing options and/or adjust components of the display, such as brightness, contrast, and horizontal and vertical positioning. For example, on a computer monitor, an on-screen display is usually activated by buttons/bars on the menu. One button/bar may bring up a display of the brightness and contrast levels. In accordance with conventional operation of the on-screen display system 412, when the user inputs the brightness control instructions through the on-screen display system 412, the microprocessor 324 generates a brightness control voltage (CTL_V) input into the inverter 408 for controlling brightness. The inverter 408 constrains the current flowing into the back light source 420 based on the brightness control voltage CTL_V from the microprocessor 324, so that the brightness of the back light source 420 is controlled accordingly.

According to conventional display technology, the user may manually adjust the brightness by providing external input instructions via the input device 318. However, in accordance with the various embodiments, the brightness of the optical touch screen apparatus 200 may be automatically controlled without manual adjustment.

Referring to FIGS. 1 and 3, the frame 230 is mounted above the display module 228, and two sets of optical transmitting devices 220 and two sets of optical receiving devices 224 are mounted on the frame 230. FIG. 3 also shows an amplifier 416 for amplifying signals received from the optical receiving devices 224. Details and operations of the amplifier 416, the optical transmitting devices 220, and the optical receiving devices 224 are further described herein.

Figure 4:
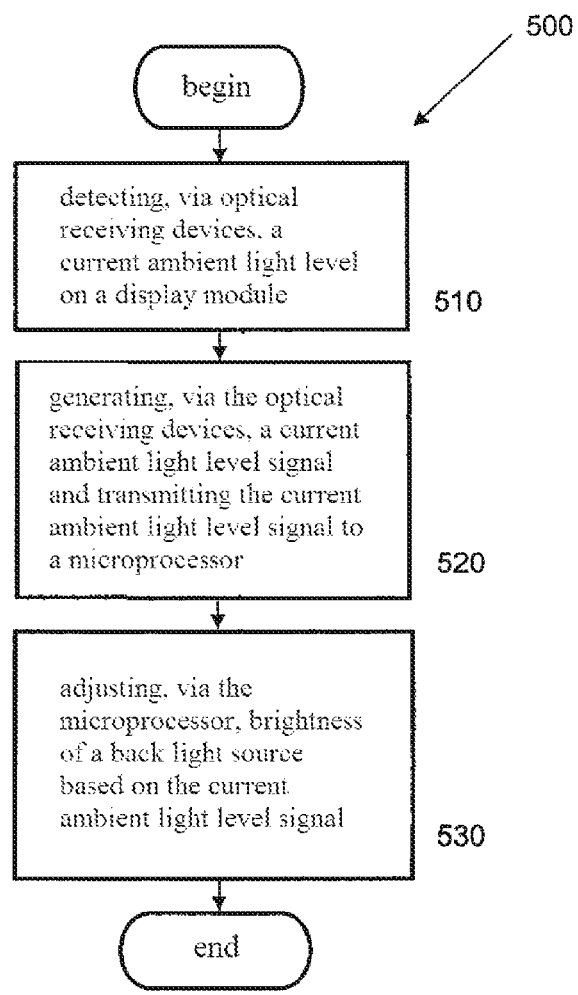
FIG. 4 illustrates a method for automatically adjusting optical touch panel brightness, according to an exemplary embodiment.

FIG. 4 shows a method 500 for automatically adjusting a brightness of an optical touch screen apparatus (e.g., an infrared touch screen apparatus) 200 in response to ambient light conditions according to an exemplary embodiment. As previously mentioned, the optical touch screen apparatus 200 may comprise a display module (e.g., LCD display module) 228 and an optical position detection device (e.g., an infrared position detection device). The display module 228 has a display area (i.e., touch area) 232 in which a touch position may be detected. As previously discussed, the infrared position detection device may comprise optical transmitting devices 220 (e.g., conventional infrared emitters), optical receiving devices 224 (e.g., conventional infrared receivers), and a frame 230 on which the optical transmitting devices 220 and the optical receiving devices 224 are mounted. The optical touch screen apparatus 200 may further comprise a microprocessor 324, a volatile memory (e.g., SRAM, DRAM) 328, and a non-volatile memory (e.g., flash memory, ROM, PROM, EPROM, EEPROM) 332. The optical touch screen apparatus 200 may be mounted on an electrical device (e.g., a POS device) 100. The optical touch screen apparatus 200 may further comprise a back light source 420, which is in different operation modes in response to different ambient light conditions. Details of the different operation modes and different conditions are further described herein.

According to an exemplary embodiment, the method 500 may comprise detecting, via the optical receiving devices (the infrared receiving devices) 224, a current ambient light level on the display module (the LCD display module) 228 (Step 510). The method 500 further may comprise generating, via the optical receiving devices (the infrared receiving devices) 224, a current ambient light level signal indicative of the current ambient light level and transmitting the current ambient light level signal to the microprocessor 324 (Step 520). The method 500 further may comprise adjusting, via the microprocessor 324, the brightness of the back light source 420 based on the current ambient light level signal (Step 530).

Referring back to FIG. 3, the non-volatile memory 332 of the control circuitry 236 may comprise a judging module 446 for determining whether the current ambient light level may be categorized into one of a plurality of conditions of ambient lighting. The operation of the judging module 446 may be achieved by software, firmware, or hardware.

Figure 5:
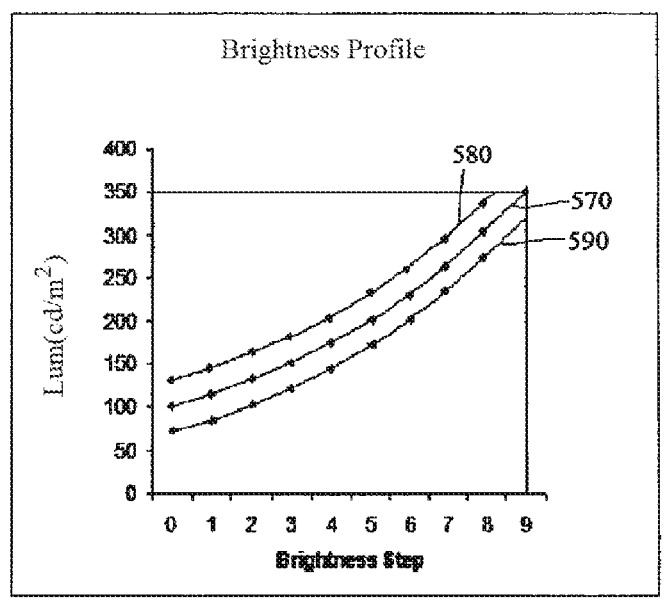
FIG. 5 illustrates a relation between ambient light level and brightness of a back light source in a LCD display module, according to an exemplary embodiment.

For most monitors (such as the LCD display module 228), a predefined relation is provided between the current ambient light level 260 and the brightness of the back light source 420. FIG. 5 illustrates one example of the predefined relation, a predefined brightness profile 570 of the LCD display module 228. Specifically, the predefined brightness profile 570 relates the current ambient light level 260 with the brightness of the back light source 420, wherein the X axis represents the brightness of the back light source 420 (e.g., the brightness step) and the Y axis represents the ambient light level. As further described herein, a first calibration brightness profile 580 and a second calibration brightness profile 590 may be defined to envelop the predefined brightness profile 570. Moreover, as further described herein, an automatically calibrated brightness of the back light source 420 may be obtained based on the predefined brightness profile 570.

According to an exemplary embodiment, in response to different ambient light conditions, the back light source 420 may be in different operation modes. Such modes may include Power saving mode, Normal mode, Low brightness mode, and Automatic calibration mode.

As previously mentioned, the amplifier 416 is electrically coupled between the optical receiving devices 224 and the control circuitry 236 (which contains the microprocessor 324). The amplifier 416 is used for amplifying the current ambient light level signal received by the optical receiving devices 224. The amplifier may be implemented by an application-specific integrated circuit (ASIC) and may have a gain value G. The gain value G is inversely proportional to the current ambient light level 260. The current ambient light level 260 is proportional to the brightness of the back light source 420. In other words, the gain value G is inversely proportional to the current ambient light level 260, and 1/G is proportional to the current ambient light level 260.

Figure 6:
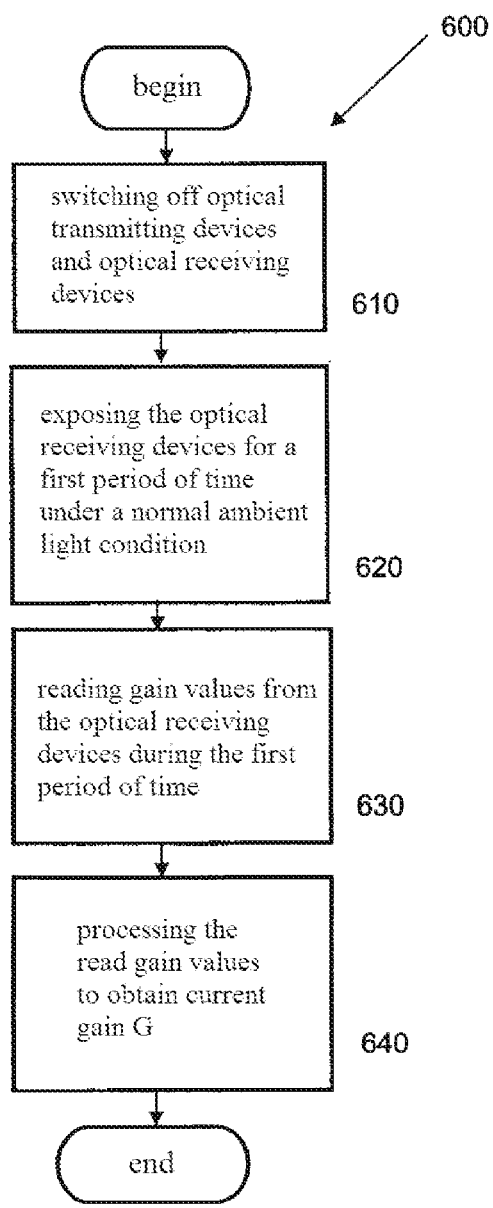
FIG. 6 illustrates how a current gain G is obtained, according to an exemplary embodiment.

FIG. 6 shows a method 600 for using the optical receiving devices 224 to obtain a current gain value G according to an exemplary embodiment. The method 600 may be used to obtain gain under a user-adjusted normal ambient light condition, such as during the business hours of a business. Specifically, the user-adjusted normal ambient light condition is directed to a situation in which lights are adjusted according to the needs of a user during normal functioning hours (e.g., ambient lighting of a shop during regular business hours). Referring back to FIG. 3, the non-volatile memory 332 of the control circuitry 236 may comprise a current gain calculation module 448 for use in obtaining the current gain G. The operation of the current gain calculation module 448 may be achieved by software, firmware, or hardware.

The method 600 may comprise switching off the optical transmitting devices 220 and the optical receiving devices 224 (Step 610). The method 600 further may comprise exposing the optical receiving devices 224 for a first period of time under a user-adjusted normal ambient light condition (step 620) and reading gain values from the optical receiving devices 224 during the first period of time (Step 630). Furthermore, the method 600 may comprise processing the gain values read during the first period of time to obtain the current gain G (Step 640).

According to an exemplary embodiment, taking a 15 inch display for example, the first period of time is less than 20 ms, preferably between about 5 ms to about 10 ms. There may be various methods for processing the read gain values to obtain the current gain G at step 640. For example, during the first period of time, all read gain values may be ranked from high to low, and an effective percentage range of the gain values may be averaged. According to an exemplary embodiment, the effective percentage range may be between 10% and 90%, preferably between 20% and 80%.

Figure 7:
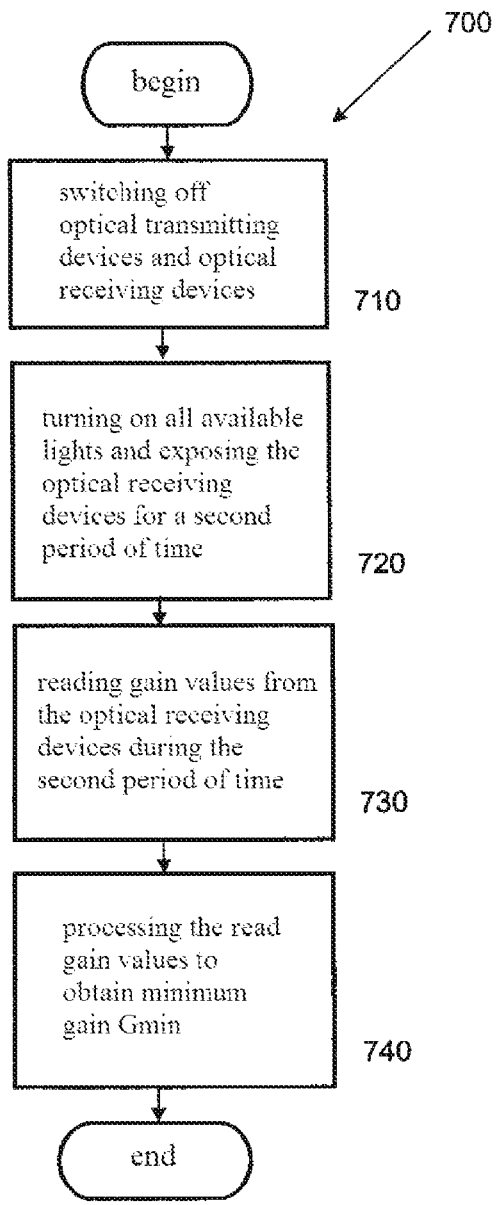
FIG. 7 illustrates how a minimum gain Gmin is obtained, according to an exemplary embodiment.

FIG. 7 shows a method 700 for using the optical receiving devices 224 to obtain a minimum gain Gmin according to an exemplary embodiment. The method 700 may be used to obtain gain under a maximum ambient light condition, such a situation in which all lights are turned on at a location (e.g., all lights being turned on during the business hours of a shop). Referring back to FIG. 3, the non-volatile memory 332 of the control circuitry 236 may comprise a minimum gain calculation module 452 for use in obtaining the minimum gain Gmin. The operation of the minimum gain calculation module 452 may be achieved by software, firmware, or hardware.

The method 700 may comprise switching off the optical transmitting devices 220 and the optical receiving devices 224 (Step 710). The method 700 further may comprise turning on all available lights and exposing the optical receiving devices 224 for a second period of time (step 720). The method 700 further may comprise reading gain values from the optical receiving devices 224 during the second period of time (Step 730). Furthermore, the method 700 may comprise processing the gain values read during the second period of time to obtain the minimum gain Gmin (Step 740).

According to an exemplary embodiment, taking a 15 inch display for example, the second period of time is less than 20 ms, preferably between about 5 ms to about 10 ms. There may be various methods for processing the read gain values to obtain the minimum gain Gmin at step 740. For example, during the second period of time, all read gain values may be ranked from high to low, and an effective percentage range of the gain values may be averaged. According to an exemplary embodiment, the effective percentage range may be between 10% and 90%, preferably between 20% and 80%.

Figure 8:
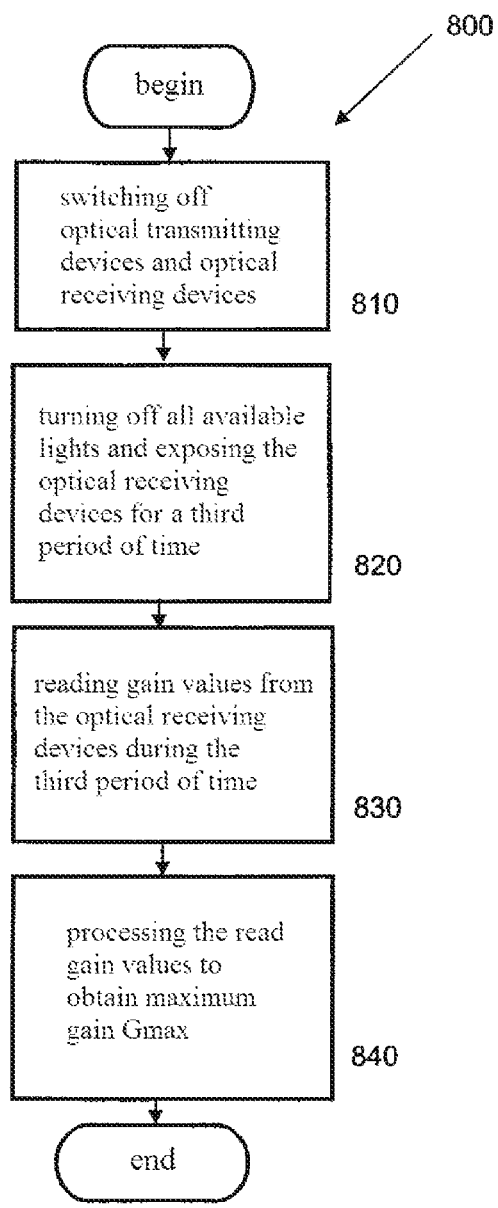
FIG. 8 illustrates how a maximum gain Gmax is obtained, according to an exemplary embodiment.

FIG. 8 shows a method 800 for using the optical receiving devices 224 to obtain a maximum gain Gmax according to an exemplary embodiment. The method 800 may be used to obtain gain under a minimum ambient light condition, such as a situation in which all lights are turned off at a location (e.g., all lights being turned off during the non-business hours of a shop). Referring back to FIG. 3, the non-volatile memory 332 of the control circuitry 236 may comprise a maximum gain calculation module 456 for use in obtaining the maximum current gain Gmax. The operation of the maximum gain calculation module 456 may be achieved by software, firmware, or hardware.

The method 800 may comprise switching off the optical transmitting devices 220 and the optical receiving devices 224 (Step 810). The method 800 further may comprise turning off all available lights and exposing the optical receiving devices 224 for a third period of time (step 820). The method 800 further may comprise reading gain values from the optical receiving devices 224 during the third period of time (Step 830). Furthermore, the method 800 may comprise processing the read gain values read during the third period of time to obtain the maximum gain Gmax (Step 840).

According to an exemplary embodiment, taking a 15 inch display for example, the third period of time is less than 20 ms, preferably between about 5 ms to about 10 ms. There may be various methods for processing the read gain values to obtain the maximum gain Gmax at step 840. For example, during the third period of time, all gain values may be ranked from high to low, and an effective percentage range of gain values may be averaged. According to an exemplary embodiment, the effective percentage range may be between 10% and 90%, preferably between 20% and 80%.

Figure 9:
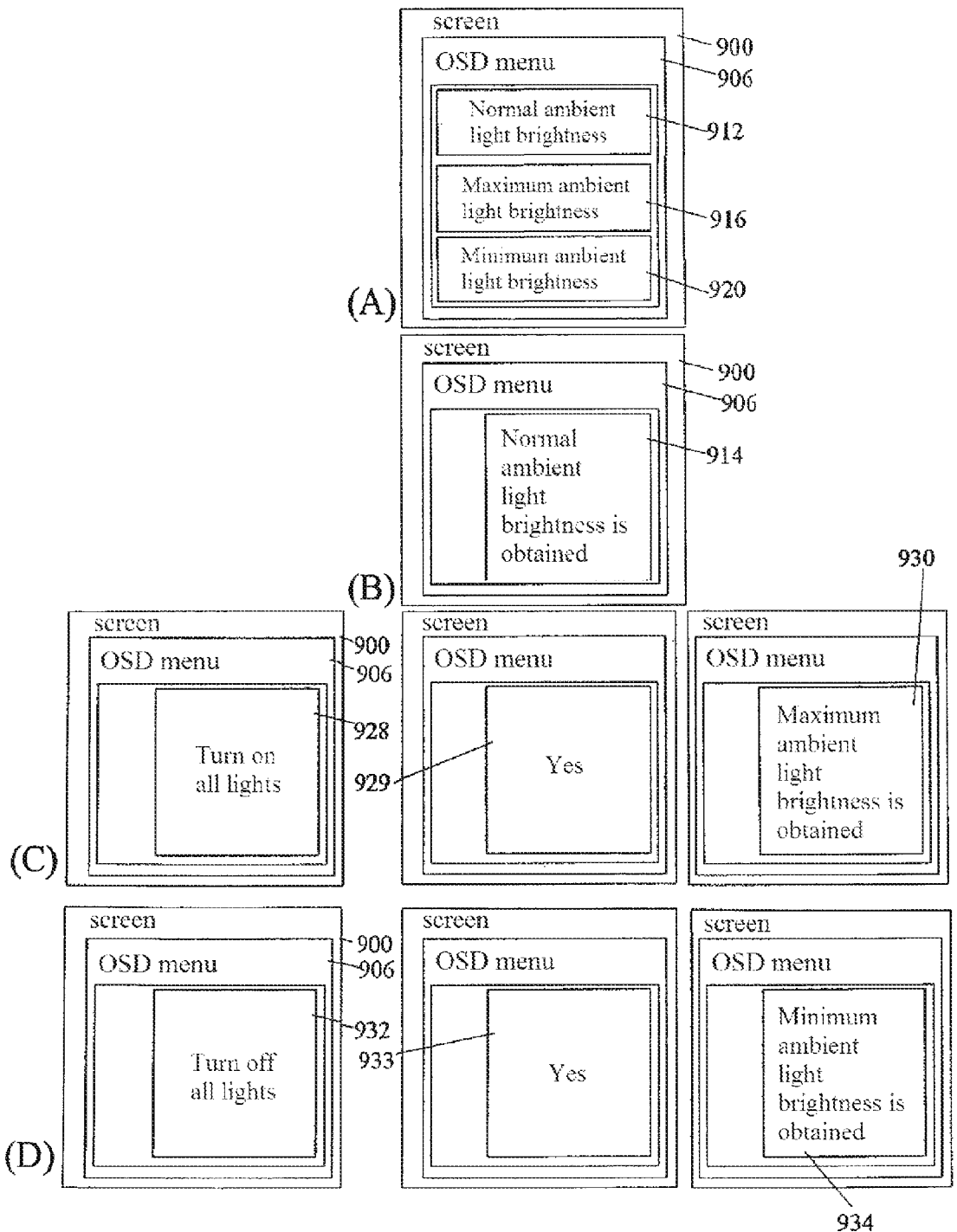
FIG. 9 illustrates an on-screen display (OSD) operation on a display module, according to an exemplary embodiment.

According to an exemplary embodiment, the above-described actions for obtaining the current gain G, obtaining said minimum gain Gmin, and obtaining said maximum gain Gmax may be achieved via the on-screen display (OSD) system 412. FIG. 9 illustrates an OSD operation on a display module (e.g., the display module 228) according to an exemplary embodiment. Referring to FIG. 9(A), the on-screen display (OSD) menu 906 is shown on the screen 900 of the display module, and the selections "Normal ambient light brightness" 912, "Maximum ambient light brightness" 916, and "Minimum ambient light brightness" 920 are shown.

Referring to FIGS. 9(A) and 9(B), if "Normal ambient light brightness" 912 is selected by a user, the current gain G may be obtained via, for example, the aforementioned method 600. Then, a dialog of "The normal ambient light brightness is obtained" 914 appears.

Referring to FIGS. 9(A) and 9(C), if "Maximum ambient light brightness" 916 is selected by a user, a dialog of "Turn on all lights" 928 appears. After all the lights are turned on and the user replies "Yes" 929, the minimum gain Gmin is obtained via, for example, the aforementioned method 700. Then, a dialog of "The maximum ambient light brightness is obtained" 930 appears.

Referring to FIGS. 9(A) and 9(D), if "Minimum ambient light brightness" 920 is selected by a user, a dialog of "Turn off all lights" 932 appears. After all the lights are turned off and the user replies "Yes" 933, the maximum gain Gmax is obtained via, for example, the aforementioned method 800. Then, a dialog of "The minimum ambient light brightness is obtained" 934 appears.

Figure 10:
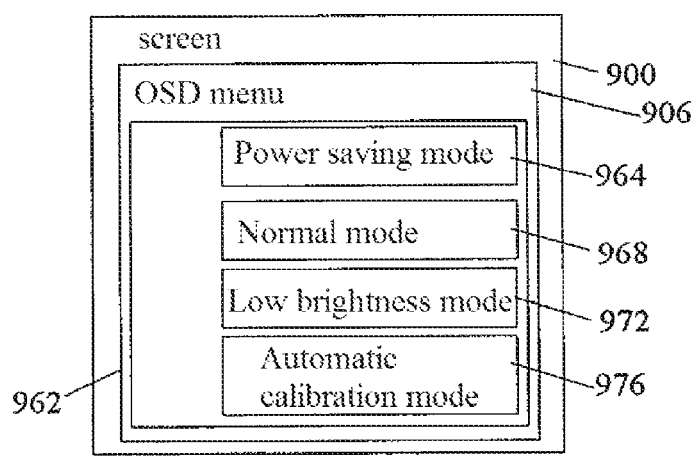
FIG. 10 illustrates an OSD operation on a display module, according to another exemplary embodiment.

FIG. 10 illustrates another OSD operation on a display module (e.g., the display module 228) according to an exemplary embodiment. In FIG. 10, an OSD menu 962 of the on-screen display window 906 is shown on the screen 900 of the display module, with the selections "Power saving mode" 964, "Normal mode" 968, "Low brightness mode" 972, and "Automatic calibration mode" 976. These selections permit a user to select one of a plurality of operation modes for the electrical device 100. Each of the operation modes is described in further detail below.

(1) Low Brightness Mode 972

In this mode, the current ambient light level 260 is maintained at a first ambient light brightness level for a relatively long time, such as 24 hours a day, seven days a week, so the back light source 420 is set to a first back light source brightness level and the electrical device 100 is correspondingly set to a normal operation configuration. The first back light source brightness level may be a relatively low brightness level, such as lower than 50 nits.

Low brightness mode 972 is suitable for a location with a substantially low brightness level for a relatively long time. For example, a display device in a night club may be well adapted for low brightness mode 972. Although the current ambient light level 260 is relatively low, the electrical device 100 is in the normal operation configuration, and the back light source 420 is constantly at a low brightness level.

(2) Power Saving Mode 964

The term power saving mode refers to an operating state in which power consumption of the display device is reduced by not using supplied electric power or by reducing the use of the supplied electric power. According to an exemplary embodiment, the power saving mode 964 is designed to allow the back light source 420 to be switched off and the electrical device 100 to be correspondingly set to a sleep operation configuration (as opposed to a normal operation configuration) in response to the current ambient light level being lower than a second ambient light brightness level. The sleep operation configuration refers to an operation configuration in which unnecessary components are shut down. For example, when the electrical device 100 is set to a sleep operation configuration, the electrical device 100 typically shuts down the display screen and disk drive. Further, the power saving mode 964 is designed to permit the back light source 420 to be switched on to a second back light source brightness level and the electrical device 100 to be correspondingly set to a normal operation configuration in response to the current ambient light level being higher than the second ambient light brightness level (e.g., the electrical device 100 may be "awakened" from a sleep operation configuration and may return to a normal operation configuration).

According to an exemplary embodiment, the second ambient light brightness level may be calculated by Gmax×P %. That is, in response to the current gain G being higher than Gmax×P %, the back light source 420 is switched off. In other words, if G>Gmax×P %, then the back light source 420 is switched off. According to an exemplary embodiment, P % may be between 70% and 90%, preferably 80%.

The power saving mode 964 is suitable for a location having non-business hours during which no lighting is needed. For example, during non-business hours when most or all of the lights are tuned off, the electrical device 100 may be set to power saving mode 964. Referring back to FIG. 3, the non-volatile memory 332 of the control circuitry 236 may comprise a power saving mode calculation module 460 for executing the calculation operation for the power saving mode 964. The calculation operation for the power saving mode 964 may be achieved by software, firmware, or hardware.

(3) Normal Mode 968

The term normal mode refers to an operating state in which the contents are displayed in a recognizable manner in response to signals supplied from the computing device 110 by using supplied electric power. According to an exemplary embodiment, regardless of the current ambient light level 260, the back light source 420 is fixedly set to a third back light source brightness level. For example, the third back light source brightness level may be determined based on a current gain G obtained in accordance with the method 600. The normal mode 968 is suitable for a location with 24-hour business hours, e.g., a POS system, an ATM, a casher, and/or a kiosk in 24-hour indoor convenience shop.

(4) Automatic Calibration Mode 976

As mentioned previously, based on the predefined relation (e.g., the predefined brightness profile 570) between the current ambient light level 260 and the brightness of the back light source 420, an automatically calibrated brightness of the back light source 420 may be obtained. That is, in response to the change of the current ambient light level 260, the automatic calibration mode 976 may allow the back light source 420 to be adjusted to the automatically calibrated brightness. Referring back to FIG. 3, the non-volatile memory 332 of the control circuitry 236 may comprise an automatic calibration mode calculation module 464 for executing the calculation operation for the automatic calibration mode 976. The calculation operation for the automatic calibration mode 976 may be achieved by software, firmware, or hardware.

Referring back to FIG. 5, the predefined brightness profile 570 may be stored in the system memory 308 of the computing device 110. As previously mentioned, a first calibration brightness profile 580 and a second calibration brightness profile 590 may be defined to envelop the predefined brightness profile 570. Under the brightness of the same back light source 420, the first calibration brightness profile 580 may be the product of the predefined brightness profile 570 times P1% (130%>P1%>105%, preferably 120%), and the second calibration brightness profile 590 may be the product of the predefined brightness profile 570 times P2% (95%>P2%>70%, preferably 80%).

The automatically calibrated brightness may be achieved by different methods. For example, the automatically calibrated brightness may be calculated by the following equation: (P2%×Gmax−G)/(P2%×Gmax−Gmin)=(P1%×U−X)/(P1%×U−P2%×U), where U is a brightness set by a user, 130%>P1%>105%, and 95%>P2%>70%.

According to an exemplary embodiment, given P1%=120 and P2%=80 for the above equation such that (0.8×Gmax−G)/(0.8×Gmax−Gmin)=(1.2×U−X)/(1.2×U−0.8×U), X can be obtained. In this exemplary embodiment, the rated maximum value of the current ambient light level 260 may be set to Pmax. For example, Pmax may be set as 350 Lum(cd/m²). When 1.2×U>Pmax, Pmax may be used instead of 1.2×U.

For the same type of the electrical device 100, in different locations (for example, a high-latitude location and a low-latitude location) or during different periods of time (for example, the winter in a high-latitude location and the summer in a low-latitude location), the automatically calibrated brightness of the back light source 420 may differ. According to an exemplary embodiment, in different environments (different locations, different periods of time, and so on), electrical devices 100 of the same type can automatically adjust their respective back light sources 420 in accordance with automatically calibrated brightness. Accordingly, in accordance with the various embodiments described herein, the disadvantages of conventional panel technology (e.g., permitting a user to set a consistently high brightness level, shortening panel life by not adjusting the brightness in accordance with ambient light conditions) may be avoided.

The aforementioned first back light source brightness level, second back light source brightness level, and third back light source brightness level associated with the above-described operation modes may be defined based on consideration of various factors, such as user needs, location, time period, environment, etc.

While various exemplary embodiments have been described above, it is evident that many alternatives, modifications and variations will be apparent to those skilled in the art. For example, the back light source 420 is not limited to a DC light source, and thus for example may be a PWM (Pulse Width Modulation) light source. Further, the predefined brightness profile 570 is not limited to the one shown in FIG. 5, and thus for example it may be alternatively a straight-line profile.

As will be appreciated by one skilled in the art, the various embodiments described herein may assume the form of a server, a client device, a method, or a computer program product. Accordingly, the various embodiments may assume the form of an entirely hardware embodiment, an entirely software embodiment (including firmware, resident software, micro-code, etc.), or an embodiment combining both software and hardware aspects. Furthermore, the various embodiments may assume the form of a computer program product embodied in any tangible medium of expression having computer-usable program code embodied in the medium.

Any combination of one or more computer usable or computer readable medium(s) may be utilized. The computer-usable or computer-readable medium may be, but is not limited to, an electronic, magnetic, optical, electromagnetic, infrared, or semiconductor system, apparatus, device, or propagation medium. The computer-readable medium may be a computer-readable storage medium. A non-exhaustive list of such computer-readable storage medium includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Such computer-readable storage medium is directed to hardware.

Additionally, note that the computer-usable or computer-readable medium could be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the various embodiments may be written in any combination of one or more programming languages, including an object oriented programming language such as Java, Smalltalk, C++, or the like and conventional procedural programming languages such as the "C" programming language or similar programming languages. The program code may execute entirely on the user's computer, partly on the user's computer, as a stand-alone software package, partly on the user's computer and partly on a remote computer or server, or entirely on the remote computer or server. In the latter scenario, the remote computer or server may be connected to the user's computer through any type of network, including a local area network (LAN) or a wide area network (WAN), or the connection may be made to an external computer (e.g., via the Internet using an Internet Service Provider).

The various embodiments are described with reference to flowchart illustrations and/or block diagrams of methods, apparatus (systems) and computer program products according to exemplary embodiments. It will be understood that each block of the flowchart illustrations and/or block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

The computer program instructions may also be stored in a computer-readable medium that can direct a computer or other programmable data processing apparatus to function in a particular manner, such that the instructions stored in the computer-readable medium produce an article of manufacture including instructions that implement the function/act specified in the flowchart and/or block diagram block or blocks.

Furthermore, the computer program instructions may be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks. Accordingly, the various embodiments set forth above are intended to be illustrative, not limiting. Various changes may be made without departing from the spirit and scope of the disclosure as defined in the following claims.

What is claimed is:

1. A method for adjusting brightness of an optical touch panel, said optical touch panel comprising a microprocessor, a display module including a back light source, and an optical position detection device including optical receiving devices, said method comprising:

generating, via said optical receiving devices, a current ambient light level signal indicative of a detected current ambient light level and transmitting said current ambient light level signal to said microprocessor;

adjusting, via said microprocessor, brightness of said back light source based on said current ambient light level signal;

obtaining a current gain G under a user-adjusted normal ambient light condition, wherein said current gain G is obtained by exposing said optical receiving devices to said user-adjusted normal ambient light condition for a first period of time, reading current gain values from said optical receiving devices during said first period of time, ranking said current gain values from high to low, and averaging an effective percentage range of said current gain values; and wherein said current gain G is inversely proportional to said current ambient light level;

obtaining a minimum gain Gmin under a maximum ambient light condition, wherein said minimum gain Gmin is obtained by exposing said optical receiving devices to said maximum ambient light condition for a second period of time, reading minimum gain values from said optical receiving devices during said second period of time, ranking said minimum gain values from high to low, and averaging an effective percentage range of said minimum gain values; and obtaining a maximum gain Gmax under a minimum ambient light condition, wherein said maximum gain Gmax is obtained by exposing said optical receiving devices to said minimum ambient light condition for a third period of time, reading maximum gain values from said optical receiving devices during said third period of time, ranking said maximum gain values from high to low, and averaging an effective percentage range of said maximum gain values.

2. The method of claim 1, wherein said back light source is in one of a plurality of operation modes, wherein said optical touch panel is arranged on an electrical device, and wherein said optical position detection device further includes optical transmitting devices.

3. The method of claim 2, wherein said plurality of operation modes comprise a low brightness mode, wherein in said low brightness mode said back light source is set to a first back light source brightness level and said electrical device is correspondingly set to a normal operation configuration in response to said current ambient light level being maintained at a first ambient light brightness level.

4. The method of claim 2, wherein said plurality of operation modes comprise a power saving mode, wherein in said power saving mode said back light source is switched off and said electrical device is correspondingly set to a sleep operation configuration in response to said current ambient light level being lower than a second ambient light brightness level, and wherein in said power saving mode said back light source is switched on to a second back light source brightness level and said electrical device is correspondingly set to a normal operation configuration in response to said current ambient light level being higher than said second ambient light brightness level.

5. The method of claim 2, wherein said plurality of operation modes comprise a normal mode in which said back light source is fixedly set to a third back light source brightness level.

6. The method of claim 2, further comprising switching off said optical transmitting devices and said optical receiving devices prior to obtaining said current gain G, said minimum gain Gmin, or said maximum gain Gmax.

7. The method of claim 1, further comprising switching off said back light source in response to said current gain G being larger than P % multiplied by said maximum gain Gmax, where P % is between 70% and 90%.

8. The method of claim 2, wherein said plurality of operation modes comprise an automatic calibration mode, and wherein, when said back light source is in said automatic calibration mode, said adjusting brightness of said back light source comprises automatically calibrating said brightness of said back light source based on a predefined relation between said current ambient light level and said brightness of said back light source in response to a change in said current ambient light level.

9. The method of claim 8, wherein said automatically calibrated brightness is calculated by: $(P2\% \times Gmax - G)/(P2\% \times Gmax - Gmin) = (P1\% \times U - X)/(P1\% \times U - P2\% \times U)$, where U is user-defined brightness, $130\% > P1\% > 105\%$, and $95\% > P2\% > 70\%$.

10. A device for adjusting brightness of an optical touch panel, said device comprising:
a display module comprising a display area and a back light source;
an optical position detection device coupled to said display module, said optical position detection device comprising optical receiving devices; and
control circuitry electrically coupled to said display module, said control circuitry comprising a memory that includes a current gain calculation module for obtaining a current gain G under a user-adjusted normal ambient light condition after said optical receiving devices are exposed for a first period of time, a minimum gain calculation module for obtaining a minimum gain Gmin under a maximum ambient light condition after said optical receiving devices are exposed for a second period of time, and a maximum gain calculation module for obtaining a maximum gain Gmax under a minimum ambient light condition after said optical receiving devices are exposed for a third period of time;
wherein said optical receiving devices generate a current ambient light level signal indicative of a detected current ambient light level and transmit said current ambient light level signal to said control circuitry, and wherein said control circuitry adjusts brightness of said back light source based on said current ambient light level signal.

11. The device of claim 10, wherein said optical position detection device further comprises optical transmitting devices, wherein said optical transmitting devices comprise a set of infrared transmitting devices and said optical receiving devices comprise a set of infrared receiving devices, and wherein said optical position detection device further comprises a frame over said display area for mounting said set of infrared transmitting devices and said set of infrared receiving devices.

12. The device of claim 10, wherein said back light source is in one of a plurality of operation modes, and wherein said optical touch panel is arranged on an electrical device.

13. The device of claim 12, wherein said plurality of operation modes comprise a low brightness mode, and wherein in said low brightness mode said back light source is set to a first back light source brightness level and said electrical device is correspondingly set to a normal operation configuration in response to said current ambient light level being maintained at a first ambient light brightness level.

14. The device of claim 12, wherein said plurality of operation modes comprise a power saving mode, wherein in said power saving mode said back light source is switched off and said electrical device is correspondingly set to a sleep operation configuration in response to said current ambient light level being lower than a second ambient light brightness level, and wherein in said power saving mode said back light source is switched on to a second back light source brightness level and said electrical device is correspondingly set to a normal operation configuration in response to said current ambient light level being higher than said second ambient light brightness level.

15. The device of claim 12, wherein said plurality of operation modes comprise a normal mode, wherein said back light source is fixedly set to a third back light source brightness level.

16. The device of claim 10, wherein said control circuitry further comprises a microprocessor, and wherein said optical touch panel device further comprises an amplifier electrically coupled between said optical receiving devices and said microprocessor for amplifying said current ambient light level signal generated by said optical receiving devices, said amplifier having a gain inversely proportional to said current ambient light level.

17. The device of claim 12, wherein said memory further includes an automatic calibration calculation module for automatically calibrating said back light source to an automatically calibrated brightness based on said current ambient light level and a predefined relation between said current ambient light level and said brightness of said back light source, and wherein said plurality of operation modes comprise an automatic calibration mode in which said back light source is automatically adjusted to said automatically calibrated brightness by said automatic calibration calculation module in response to a change in said current ambient light level.

18. A computer program product comprising a non-transitory computer-readable medium having program instructions embodied therewith for adjusting brightness of an optical touch panel, wherein said optical touch panel includes a microprocessor, a display module including a back light source, and an optical position detection device including optical receiving devices, and wherein said program instructions are executable by a computing device to cause said computing device to:
generate, via said optical receiving devices, a current ambient light level signal indicative of a detected current ambient light level and transmitting said current ambient light level signal to said microprocessor;
adjust, via said microprocessor, brightness of said back light source based on said current ambient light level signal;
obtain a current gain G under a user-adjusted normal ambient light condition, wherein said current gain G is obtained by exposing said optical receiving devices to said user-adjusted normal ambient light condition for a first period of time, reading current gain values from said optical receiving devices during said first period of time, ranking said current gain values from high to low, and averaging an effective percentage range of said current gain values; and wherein said current gain G is inversely proportional to said current ambient light level;
obtain a minimum gain Gmin under a maximum ambient light condition, wherein said minimum gain Gmin is obtained by exposing said optical receiving devices to said maximum ambient light condition for a second period of time, reading minimum gain values from said optical receiving devices during said second period of time, ranking said minimum gain values from high to low, and averaging an effective percentage range of said minimum gain values; and
obtain a maximum gain Gmax under a minimum ambient light condition, wherein said maximum gain Gmax is obtained by exposing said optical receiving devices to said minimum ambient light condition for a third period of time, reading maximum gain values from said optical receiving devices during said third period of time, ranking said maximum gain values from high to low, and averaging an effective percentage range of said maximum gain values.

19. The computer program product of claim 18, wherein said back light source is in one of a plurality of operation modes, wherein said optical touch panel is arranged on an electrical device, and wherein said optical position detection device further includes optical transmitting devices.

20. The computer program product of claim 19, wherein said plurality of operation modes comprise a low brightness mode, wherein in said low brightness mode said back light source is set to a first back light source brightness level and said electrical device is correspondingly set to a normal operation configuration in response to said current ambient light level being maintained at a first ambient light brightness level.

* * * * *